United States Patent
Allen

(10) Patent No.: US 10,708,162 B1
(45) Date of Patent: Jul. 7, 2020

(54) TECHNIQUES FOR MODELING RESPONSE BEHAVIOR IN NETWORK COMPUTING SERVICES AND APPLICATIONS

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 448 days.

(21) Appl. No.: 14/572,621

(22) Filed: Dec. 16, 2014

(51) Int. Cl.
 *H04L 12/26* (2006.01)
 *H04L 12/24* (2006.01)

(52) U.S. Cl.
 CPC .......... *H04L 43/0876* (2013.01); *H04L 41/50* (2013.01)

(58) Field of Classification Search
 CPC .................................. H04L 43/0876
 USPC ........................................ 709/224
 See application file for complete search history.

(56) References Cited

U.S. PATENT DOCUMENTS

| | | | | |
|---|---|---|---|---|
| 8,849,764 B1* | 9/2014 | Long | ................... | G06F 11/1451 707/646 |
| 9,100,330 B1* | 8/2015 | Noveck | ................. | H04L 47/283 |
| 2010/0146237 A1* | 6/2010 | Takai | ................... | G11C 7/1066 711/167 |
| 2012/0017156 A1* | 1/2012 | Broda | ................. | G06F 11/3409 715/736 |
| 2012/0275278 A1* | 11/2012 | Wilson | ..................... | G11B 5/02 369/13.24 |
| 2013/0185477 A1* | 7/2013 | Acuna | ................... | G06F 11/263 711/103 |
| 2013/0318022 A1* | 11/2013 | Yadav | .................... | G06Q 10/00 706/46 |

* cited by examiner

*Primary Examiner* — Sm A Rahman
*Assistant Examiner* — Emad Siddiqi
(74) *Attorney, Agent, or Firm* — Davis Wright Tremaine LLP

(57) ABSTRACT

Techniques described and suggested herein include observing, monitoring and storing sequence data and lag data associated with write and read operations between an application and a service, such as a service provided by a computing resource service provider, so as to simulate or otherwise derive consistency behavior observed therewith. The sequence data and/or lag data may be used to configure a service, such as a mock service similar to the observed service, to respond in a fashion similar to the previously monitored service.

19 Claims, 8 Drawing Sheets

TECHNIQUES FOR MODELING RESPONSE BEHAVIOR IN NETWORK COMPUTING SERVICES AND APPLICATIONS

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

However, the distributed, decentralized nature of some network computing environments increases the likelihood that services provided therefrom, while reliable and high-performance, may have somewhat less deterministic or predictable consistency (e.g., with regard to time-to-response, or "lag"). Many computing applications are designed to assume relatively consistent service response times from services connected therewith. As network computing becomes more widespread, however, computing applications are increasingly being created and designed with considerations related to network computing. The variable consistency of the type observed in many network computing services may be challenging to replicate in development and/or test environments.

BRIEF DESCRIPTION OF THE DRAWINGS

Various embodiments in accordance with the present disclosure will be described with reference to the drawings, in which.

DETAILED DESCRIPTION

Figure 1:
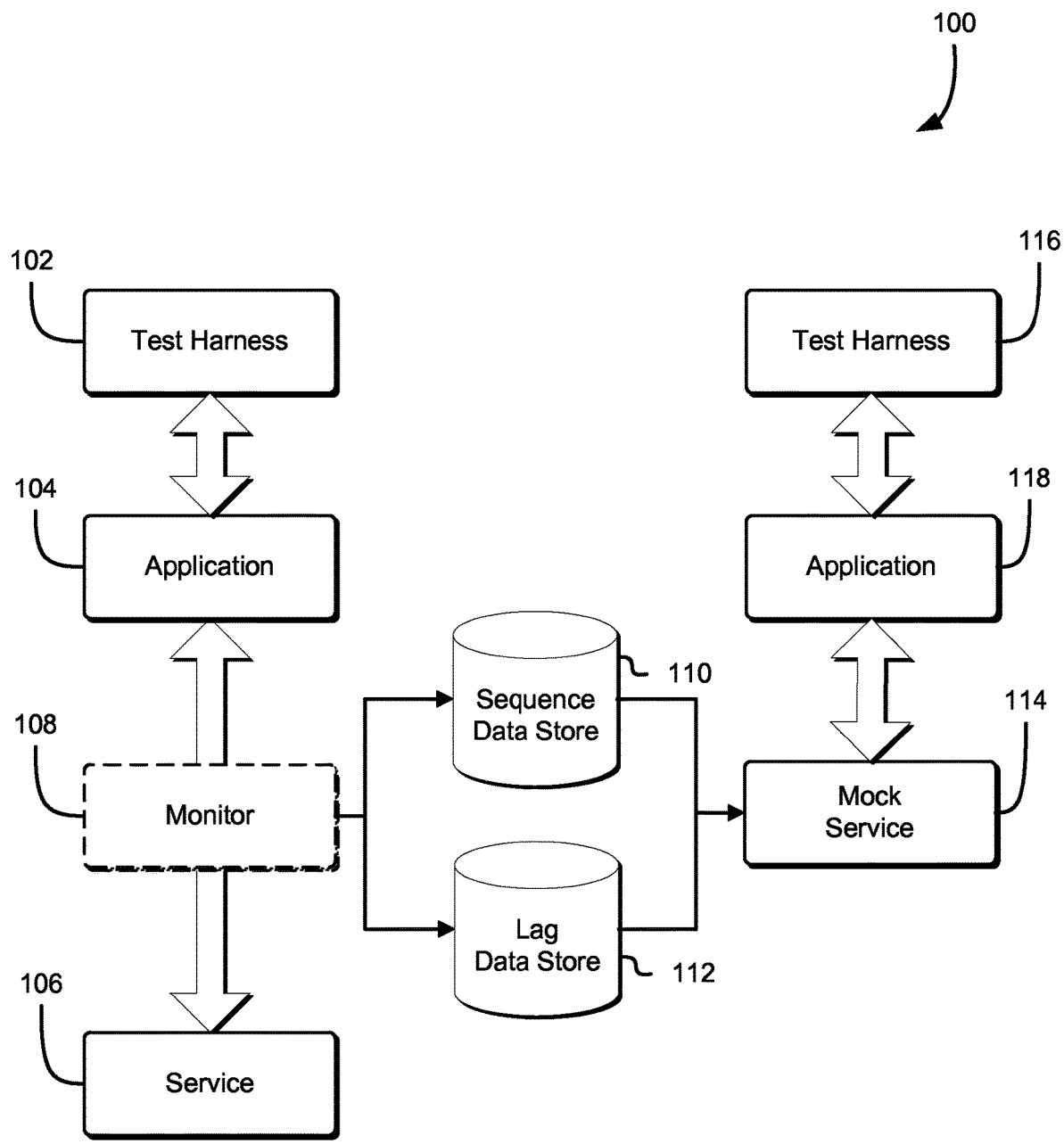
FIG. 1 schematically illustrates an environment implementing a monitor to observe application-to-service interactions, and configuring a mock service with such interactions, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include observing, monitoring and storing sequence data and lag data associated with write and read operations between an application and a service, such as a service provided by a computing resource service provider. The sequence data and/or lag data may be used to configure a service (either the same service from which the data was derived, or a different service, such as a test or mock service) to respond in a number of ways. For example, a test harness connected or otherwise associated with an application may communicate with a service, such as by submitting read and write requests for a given application data element. A monitor may be configured to observe such read and write requests. In the case of a write request, the data values written for the application data element may be recorded over time, along with a timestamp at which the data value was written for that application data element, in a sequence data store. In the case of a read request for that application data element, a potential value based on the time at which the read was requested may be compared with the actual value provided by the service, and based on the timestamps previously stored in the sequence data store, a lag value may be recorded on a lag data store.

In some embodiments, sequence data and/or lag values may be used to configure a service, such as a test service intended to simulate a service provided by a computing resource service provider, so as to simulate some or all of the behavior exhibited by the server from which the sequence data and/or lag values were derived. For example, a test service may be configured to connect, directly or indirectly (such as through the monitor), with one or both of the sequence data store and/or the lag data store. Some or all of the sequence data may be used to populate the test service, so as to simulate one or more application data elements associated with the service being simulated. Some or all of the lag data may be used to configure the test service to respond with response time levels of interest. In some embodiments, a worst-case lag value is calculated from the lag values, and the test service is configured so as to respond to requests (e.g., reads) related to the application data element with values that simulate a worst-case lag scenario. In some embodiments, a median lag value may be selected therefrom, and the test service may thereby respond in a fashion simulating the average response time of the previously observed service. In some embodiments, the test service may be configured to respond with variable lag, based on the previously determined lag values.

FIG. 1 schematically illustrates an environment implementing a monitor to observe application-to-service interactions, and configuring a mock service with such interactions, in accordance with some embodiments. In some embodiments, a test harness 102 is connected, directly or indirectly, to an application 104, which in turn transacts with service 106. The test harness may be any entity capable of manipulating inputs and outputs of the application 104. For example, the test harness may be a computing entity (such as a physical computing entity, or in some embodiments, computing resources provided by a computing resource service provider), a software application (such as a software application that interacts with the application in a programmatic fashion, e.g., via application programming interface calls), and the like. The test harness 102 may be variably configurable so as to test specific functionality or modules of the application, and under varying conditions (e.g., load, boundary, user scenarios, etc.). The test harness 102 may interact with the application using a physical connection, such as via a network, or using programmatic capabilities, such as an application programming interface.

The application 104 may be any software application, or combination of software and hardware, that is capable of receiving inputs from the test harness 102 and transacting with service 106. For example, the application 104 may be a standalone application running on a computing entity. As another example, the application 104 may be a networked application or service, such as that provided by a customer of a computing resource service provider. In some embodiments, the application may be a service capable of communicating with other services, such as service 106, and the connection between the application 104 and the service 106 may represent a connection between a customer and a computing resource service provider.

Services, such as a service 106 provided by a computing resource provider, are described in further detail below. In some embodiments, the service 106 is implemented in a distributed fashion across multiple computing resources of a computing resource service provider. For example, a service 106 so implemented may be subject to queuing or other load balancing system for incoming and outgoing data and requests, and is configured to service requests (such as read and write requests thereto) within a specified time, such as a time specified in a service-level agreement between the customer and the computing resource service provider.

In some embodiments, a service 106 may return outdated or "stale" data in response to some requests, such as reads, if pending writes for the data being read had not yet been committed at the time the service provides the data in response to a read request. The delay between a time associated with the potential value returned, such as in response to a read request for a given application data element, and a time associated with the actual value returned, is referred to herein as lag. By way of example, the application 104 may write values A, B, and C to service 106 at relative times 0, 25, and 50, respectively, for a given application data element. If at relative time 75, the application 104 reads the application data element and the service 106 provides the value C, there is no lag, as the service 106 returned the most up-to-date value. However, if the service 106 returns B at relative time 75, the calculated lag would be 50. Similarly, if the service 106 returns A at relative time 75, the calculated lag would be 75. In some embodiments, the potential value that serves as the basis for calculating the lag may be a value other than the most current value expected from the service 106. For example, the potential value may be derived from or otherwise account for the effects of inherent delay, internal or otherwise, in the service 106 (such as would be memorialized in a service-level agreement (SLA)).

In some embodiments, a monitor 108 is implemented to observe interactions between the application 104 and the service 106. The monitor 108 may be any entity capable of monitoring data and interactions between the application 104 and the service 106. For example, the monitor may be a standalone computing entity, a virtual computing system (such as one provided by a computing resource service provider), a network processor or other network device, a software application running on a computing entity as described above, a service, and the like.

The monitor 108 may, in some embodiments, process and generate various types of data in response to its detection of writes to and reads from the service. For example, writes from the application 104 to the service 106 may trigger monitor 108 to generate sequence data associated with the write, and store such sequence data on sequence data store 110. The sequence data may include a sequence number (e.g., an index), the data value associated with each write, and a timestamp associated with each write (e.g., a value representing the time at which the monitor detected that the application 104 was writing the data to the service 106). The timestamp may be represented in any appropriate unit, such as the time in minutes, seconds, milliseconds, microseconds, nanoseconds, picoseconds, timer ticks, and the like, and may be stored relative to any appropriate reference, such as a system clock, an atomic clock, the time relative to the application, the time relative to the service, the monitor's own clock, and the like. In embodiments where multiple application data elements are being tracked by the monitor 108, multiple sets of sequence data may be generated and stored on sequence data store 110.

In some embodiments, read requests from the application 104 to the service 106 may trigger monitor 108 to generate lag data associated with the read, and store such lag data on lag data store 112. For example, the lag data may include the lag value associated with each read for a given application data element, such as described above. Such lag values may be stored sequentially, in an indexed fashion, or the like. The lag values may be represented in any appropriate unit, such as a difference in seconds, milliseconds, microseconds, nanoseconds, picoseconds, timer ticks, and the like. In embodiments where the service multiple application data elements are being tracked by the monitor 108, multiple sets of lag data may be generated and stored on lag data store 112.

The monitor 108 may observe the interaction between the application 104 and the service 106 for a predetermined length of time, so as to record sufficient sequence data and lag data as to provide an accurate representation of the service's 106 consistency. In some embodiments, the monitor may run continuously and/or permanently. At a time after sequence data and lag data have been recorded, such as on the sequence data store 110 and the lag data store 112, respectively, such sequence data and/or lag data are used to configure a mock service 114. The mock service 114 may be substantially similar in functionality to the service 106, and may or may not be provided by the same entity as the service 106. In some embodiments, the mock service 114 is a test service that is not accessible to the public and may not contain "live" data.

In some embodiments, the sequence data store 110 is connected, directly or indirectly (such as by way of the monitor 108), with the mock service 114 so as to populate mock service 114 with some or all of the historical data values associated with one or more application data elements of the service 106. In such embodiments, the mock service 114 may read the sequence data directly from the sequence data store 110, or may use the sequence data stored thereon to derive the values to be stored separately by a separate data store accessible to the mock service 114.

In some embodiments, the lag data store 112 is connected, directly or indirectly (such as by way of the monitor 108), with the mock service 114 so as to configure the mock service 114 to respond to read requests for the associated application data element with varying amounts of lag. For example, one or more of the lag values may be used to calculate one or more simulated lag values with which to configure the mock service 114. The calculation of the simulated lag value(s), as well as the configuration of the mock service 114, may be performed by any appropriate entity capable thereof, such as the application 104, the test harness 102, the monitor 108, and so on. In some embodiments, the simulated lag value(s) may be manually calculated, such as by a human, and the mock service 114 may similarly be manually configured.

In some embodiments, the simulated lag value may be calculated such that the mock service 114 is configured with a worst-case lag value among the lag data stored on the lag data store 112. For example, one or more of the highest lag values among the stored lag data may be determined to be a worst-case lag for the service 106, and the mock service 114 may be thereby configured, such as by a test harness 116, to respond to read requests with the worst-case lag. In some embodiments, a mean or median of the lag values stored on lag data store may be used to configure the mock service 114. In some embodiments, lag values within a bound of the lag values stored on lag data store 112 may be selected randomly, or pseudo-randomly, such as by test harness 116, for configuration of mock service 114. In some embodiments, a sequence of the lag values stored in the lag data store 112 may be used to configure the mock service 114 in a similar sequence, such as to "play back" various lag responses in a similar (or the same) order as observed by the monitor 108 from the interactions between the application 104 and the service 106.

In some embodiments, the test harness 116 induces application 118 to interact with the configured mock service 114 in a similar fashion as the test harness 102, the application 104, and the service 106. In some embodiments, the test harness 116 is the same or substantially similar to the test harness 102. In some embodiments, the application 118 is the same or substantially similar to the application 104. In alternate embodiments, the application 118 may be a test version of the application 104, such as a newer or pre-release version. The mock service 114 may, in some embodiments, be the same or substantially similar in functionality to the service 106. In certain embodiments, the mock service 114 may be provided by, for example, a computing resource service provider, such as a computing resource service provider providing the service 106. In other embodiments, the mock service 114 may be provided by a different entity, such as a customer of the computing resource service provider, so as to simulate some or all of the functionality of the service 106 without connecting to the computing resource service provider. Services, customers, and computing resource service providers are discussed in further detail immediately below.

Figure 2:
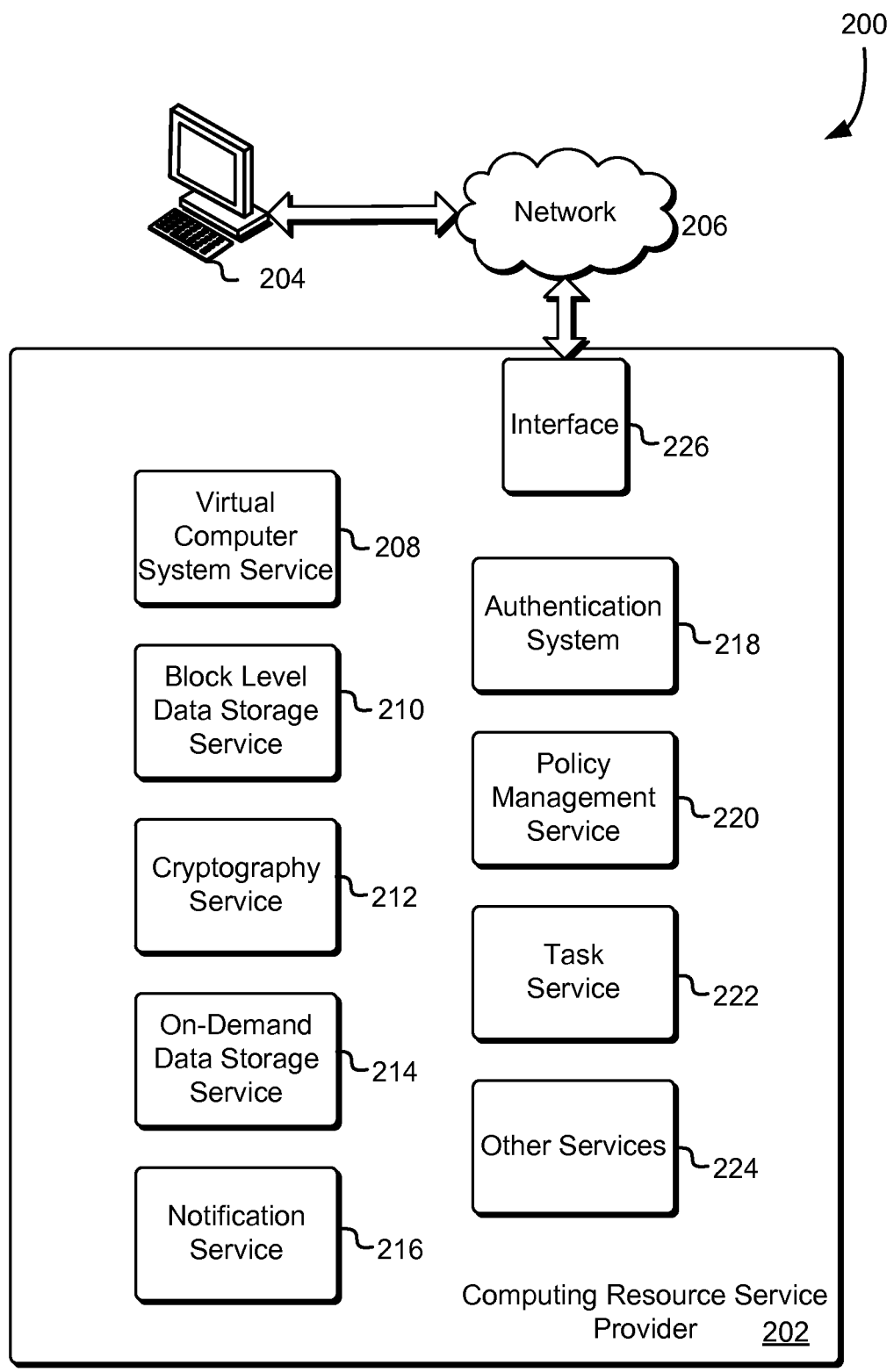
FIG. 2 schematically illustrates an example environment implementing a computing resource service provider capable of providing services over a network, in accordance with some embodiments.

FIG. 2 schematically illustrates an example environment implementing a computing resource service provider capable of providing services over a network, in accordance with some embodiments. The computing resource service provider 202 may provide a variety of services to the customer 204 and the customer 204 may communicate with the computing resource service provider 202 via an interface 226, which may be a web services interface or any other type of customer interface. While FIG. 2 shows one interface 226 for the services of the computing resource service provider 202, each service may have its own interface and, generally, subsets of the services may have corresponding interfaces in addition to or as an alternative to the interface 226. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network 206 may be a communication network, such as the Internet, an intranet or an Internet service provider (ISP) network. Some communications from the customer 204 to the computing resource service provider 202 may cause the computing resource service provider 202 to operate in accordance with one or more embodiments described herein or a variation thereof.

The computing resource service provider 202 may provide various computing resource services to its customers. The services provided by the computing resource service provider 202, in this example, include a virtual computer system service 208, a block-level data storage service 210, a cryptography service 212, an on-demand data storage service 214, a notification service 216, an authentication system 218, a policy management service 220, a task service 222 and one or more other services 224. It is noted that not all embodiments described herein include the services 208-224 described with reference to FIG. 2 and additional services may be provided in addition to or as an alternative to services explicitly described herein. As described herein, each of the services 208-224 may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block level data storage service 210).

The virtual computer system service 208 may be a collection of computing resources configured to instantiate virtual machine instances on behalf of the customer 204. As used, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

The customer 204 may interact with the virtual computer system service 208 (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 208 is shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 also includes a cryptography service 212. The cryptography service 212 may utilize one or more storage services of the computing resource service provider 202 to store keys of the customers in encrypted form, whereby the keys may be usable to decrypt customer 212 keys accessible only to particular devices of the cryptography service 212.

The computing resource service provider 202 further includes an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service 214 may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects that may be used by the customer 204 to retrieve or perform other operations in connection with the data objects stored by the on-demand data storage service 214.

In the environment illustrated in FIG. 2, a notification service 216 is included. The notification service 216 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 216 may provide notifications to clients using a "push" mechanism without the need to check periodically check or "poll" for new information and updates. The notification service 216 may further be used for various purposes such as monitoring applications executing in the virtual computer system service 208, workflow systems, time-sensitive information updates, mobile applications, and many others.

As illustrated in FIG. 2, the computing resource service provider 202, in various embodiments, includes an authentication system 218 and a policy management service 220. The authentication system 218, in an embodiment, is a computer system (i.e., collection of computing resources) configured to perform operations involved in authentication of users of the customer. For instance, one of the services 208-216 and 220-224 may provide information from a user to the authentication service system 218 to receive information in return that indicates whether the user requests are authentic.

The policy management service 220, in an embodiment, is a computer system configured to manage policies on behalf of customers (such as customer 204) of the computing resource service provider 202. The policy management service 220 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 202, in various embodiments, is also equipped with a task service 222. The task service 222 is configured to receive a task package from the customer 204 and enable executing tasks as dictated by the task package. The task service 222 may be configured to use any resource of the computing resource service provider 202, such as one or more instantiated virtual machines or virtual hosts, for executing the task. The task service 224 may configure the one or more instantiated virtual machines or virtual hosts to operate using a selected operating system and/or a selected execution application in accordance with a requirement of the customer 204.

The computing resource service provider 202 additionally maintains one or more other services 224 based at least in part on the needs of its customers 204. For instance, the computing resource service provider 202 may maintain a database service for its customers 204. A database service may be a collection of computing resources that collectively operate to run one or more databases for one or more customers 204. The customer 204 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services.

Figure 3:
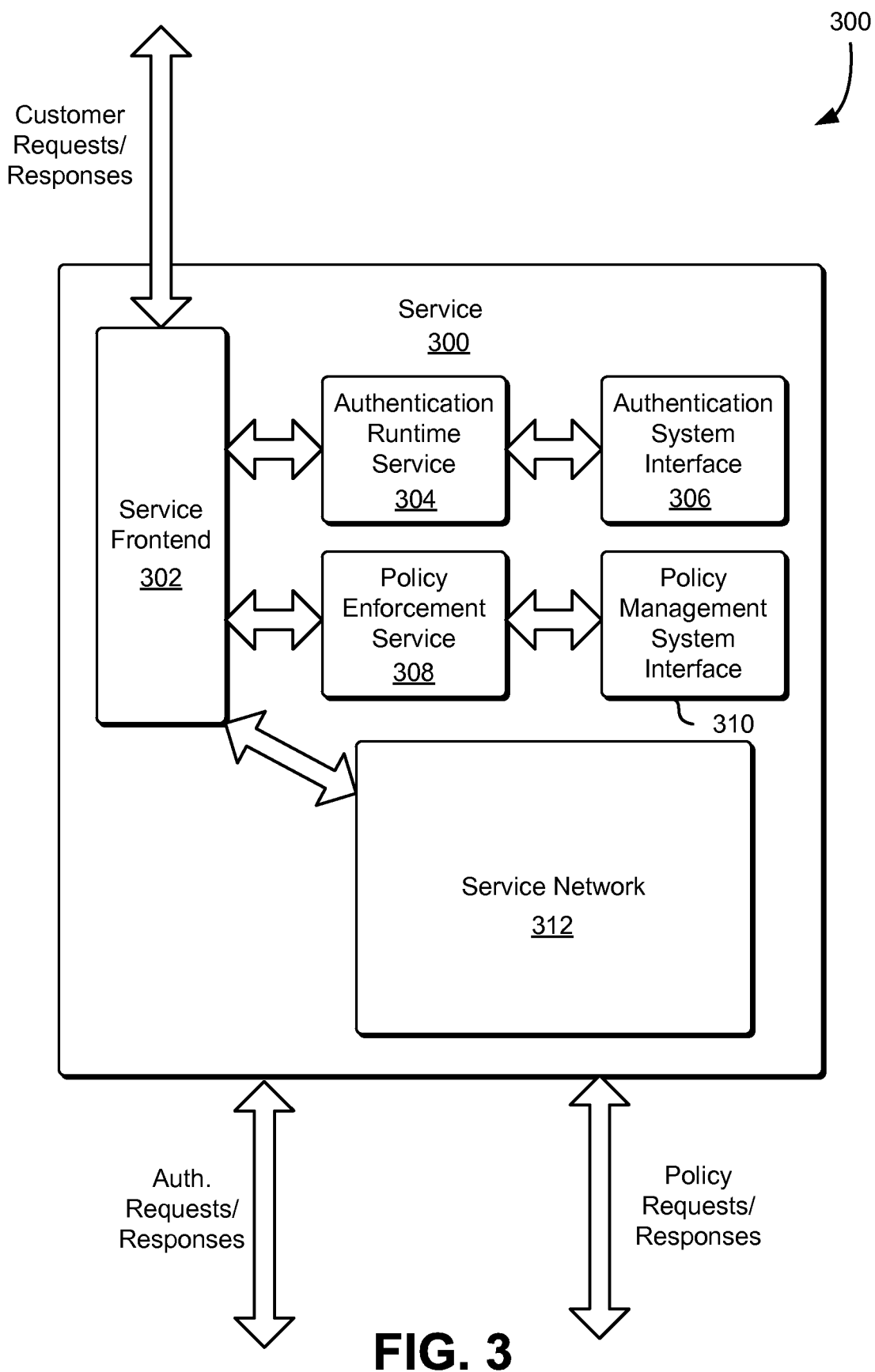
FIG. 3 schematically illustrates an example configuration of a service capable of being monitored in accordance with techniques described herein, in accordance with some embodiments.

FIG. 3 schematically illustrates an example configuration of a service capable of being monitored in accordance with techniques described herein, in accordance with some embodiments. The service 300 may be, for example, one of the services described above in connection with FIG. 2. For example, the service 300 could be a virtual computer system service 208, a block-level data storage service 210, a cryptography service 212, an on-demand data storage service 214 or a notification service 216, among others. It should be noted that while FIG. 3 illustrates various components of the service 300, the components of various services may vary in accordance with various embodiments and may include components different from those illustrated. As shown in FIG. 3, the service 300 includes a service frontend 302. The service frontend 302 may include a collection of computing resources collectively configured to provide an interface by which customers may communicate, such as through application programming interface (API) calls, to the frontend service 302. The frontend service 302, for instance, may include one or more web servers, one or more load balancers, one or more application servers, and generally other computing resources described.

The service frontend 302 may be configured to receive customer requests and provide responses to the requests. The service frontend 302 may also include an interface that enables the receipt and processing of requests from other services, such as any one of the services 208-224 described with reference to FIG. 2. In order to process the requests, the service frontend 302 may interact with various other components of the service 300. For example, as illustrated in FIG. 3, the service 300 includes an authentication runtime service 304. The authentication runtime service 304, like the service at frontend 302, may be a subsystem of the service 300 comprising a collection of computing resources collectively configured to make determinations regarding authentication to enable the service frontend 302 to deny or fulfill requests as appropriate. In an embodiment, when the service frontend 302 receives a request, the service frontend 302 communicates with the authentication runtime service 304 to determine whether the request is authentic. The request may, for instance, include an electronic signature generated using a secret shared among the customer and an authentication system such as described above in connection with FIG. 2. The authentication runtime service 304 may transmit information via an authentication system interface 306 which enables the authentication runtime service 304 to obtain determinations from an authentication system such as described above in connection with FIG. 2 whether the request is authentic. In operating to determine whether requests are authentic, the authentication runtime service 304 may cache certain information in order to enable the authentication runtime service 304 to make a determination regarding authentication without authentication to an authentication system through the authentication system interface 306. It should be noted that while FIG. 3 illustrates a particular embodiment, the service 300 may authenticate requests in any suitable manner and not necessarily in the manner shown.

As illustrated in FIG. 3 the service frontend 302 also communicates with a policy enforcement service 308 in order to determine whether to fulfill certain requests. The policy enforcement service 308 may be a subsystem of the service 300 that comprises a collection of computing resource collectively configured to enable the service frontend 302 to determine whether to fulfill or deny requests. As with the authentication runtime service 304, the policy enforcement service 308 may communicate with a policy management system (not illustrated in the figure) for determining whether fulfillment of a request complies with the policy. For example, when the service frontend 302 receives a request, it may transmit the request or information based at least in part on the request to the policy enforcement service 308. The policy enforcement 308 may transmit information, via a policy management system interface 310, to a policy management system in order to make the determination. As with the authentication runtime service 304, the policy enforcement service 308 may cache a variety of information in order to enable determinations of whether fulfillment of requests complies with policies without communicating with the policy management system.

In various embodiments, the service frontend 302 also communicates with a service network 312 when received requests are determined to be both authentic and fulfillable in compliance with policy. The service network 312 may be a subsystem of the service 300 comprising a collection of computing resources configured to operate in support of providing a service. For example, in an embodiment whether the service 300 is a virtual computer system service 208, the service network 312 may comprise a plurality of physical host computing devices that implement virtual computer systems on behalf of customers of the service 300. Requests through the service frontend 302 may relate to operation of the virtual computer systems implemented using the service network 312. For instance, requests may be submitted to the service frontend 302 for the purpose of provisioning, deprovisioning, modifying, or otherwise remotely managing virtual computer systems. In the example of a block-level data storage service 210, the service network 312 may comprise a collection of data storage servers with corresponding data storage devices.

The service frontend 302 may interact with the service network 312 for various purposes such as allocating storage space to customers, deallocating storage space for customers, and generally in connection with management of one or more virtual block level data storage devices provided by the service 300. In the example of the cryptography service 212, the service network 312 may include various hardware devices that enable the secure management of cryptographic keys. For example, the service network 312 may comprise a plurality of security modules (e.g., hardware security modules) which may be devices that securely store cryptographic key material. The service network for a cryptography service may also include data storage devices for storing keys on behalf of customers and generally other devices supporting operation of the cryptography service. In the example of an on-demand data storage service 214, the service network 312, as with the block-level data storage service 210, may include data storage servers and corresponding data storage devices.

The service network 312 may also include one or more databases in order to operate as key value stores to enable the efficient location of data within the service network 312. The service network 312 may also include other devices (e.g., server computer systems), such as devices that operate to durably. Generally, the service network 312 may include computing resources applicable to the service being provided. In addition, while not illustrated, the service network 312 may include appropriate networking devices such as routers, switches, load balancers, and other devices that enable the collective operation of the devices in the storage network 312. Of course, the exact resources that are included and their collective configuration will vary in accordance with the various services and the various embodiments in which they are implemented.

Figure 4:
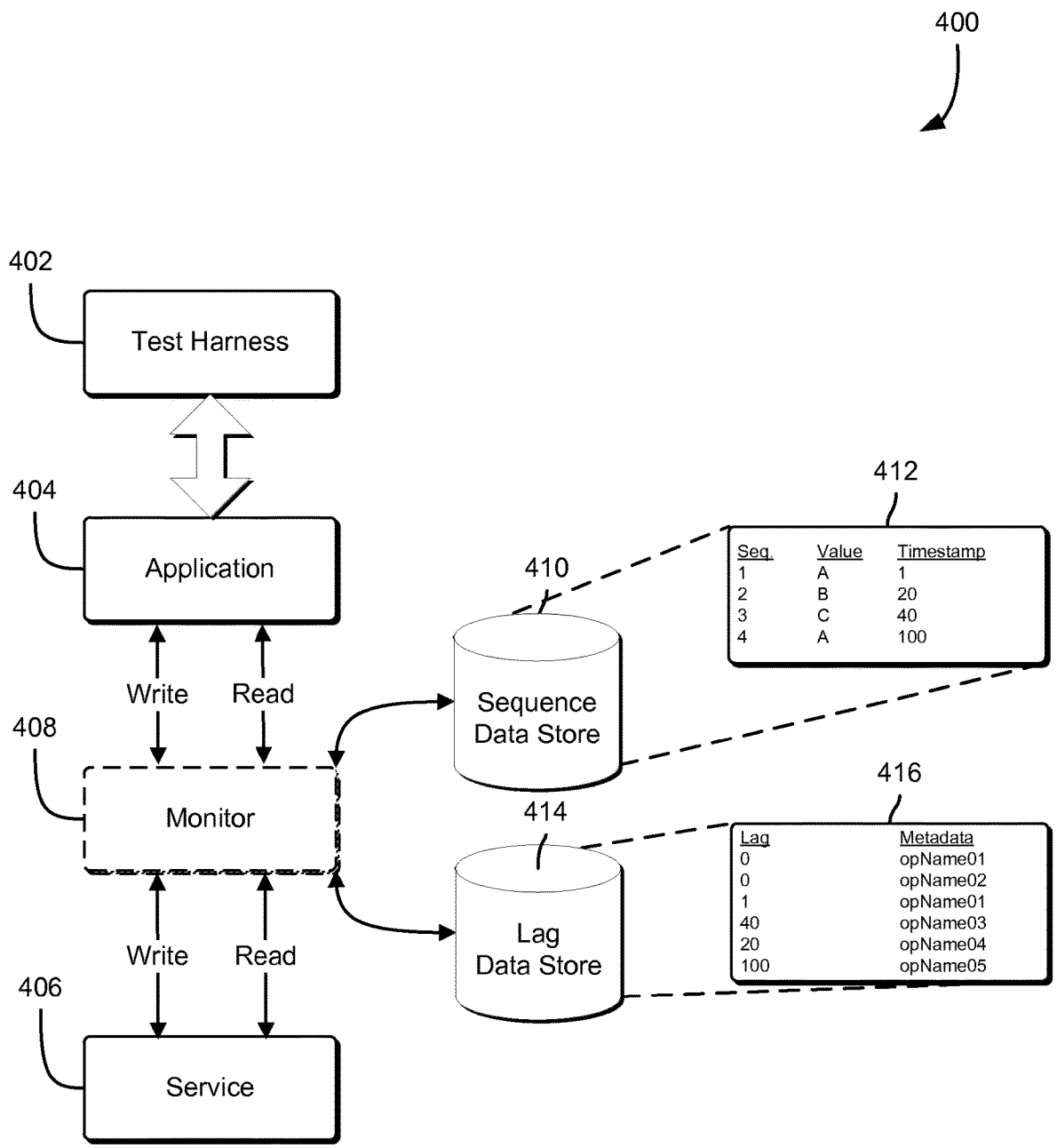
FIG. 4 schematically illustrates workflows for monitoring and storing sequence and lag data associated with a service, in accordance with some embodiments.

FIG. 4 schematically illustrates workflows for monitoring and storing sequence and lag data associated with a service, in accordance with some embodiments. In some embodiments, a test harness 402 is connected, directly or indirectly, to an application 404, which in turn transacts with service 406. The test harness 402, the application 404, and the service 406 may be similar to the test harness 102, the application 104, and the service 106 described above in connection with at least FIG. 1. As previously discussed, the test harness may be any entity capable of manipulating inputs and outputs of the application 104. For example, the test harness may be a computing entity (such as a physical computing entity, or in some embodiments, computing resources provided by a computing resource service provider), a software application (such as a software application that interacts with the application in a programmatic fashion, e.g., via application programming interface calls), and the like.

The test harness 402 may be variably configurable so as to test specific functionality or modules of the application, and under varying conditions. For example, the test harness 402 may be used to perform load testing, boundary testing, user scenarios testing, user interface testing, unit testing, and the like. The test harness 402 may interact with the application using a physical connection, such as via a network, or using programmatic capabilities, such as an application programming interface. The test harness 402 may interact with the application by simulating and/or automating human inputs thereto, or, in some embodiments, may interact with the application's functionality using programmatic methods, such as through hooks, application programming interface calls, web service calls, and the like.

The application 404 may be any software application, or combination of software and hardware, that is capable of receiving inputs from the test harness 402 and transacting with service 406. For example, the application 404 may be a standalone application running on a computing entity. As another example, the application 404 may be a networked application or service, such as that provided by a customer of a computing resource service provider. In some embodiments, the application may be a service capable of communicating with other services, such as service 406.

In some embodiments, the service 406 is implemented in a distributed fashion across multiple computing resources of a computing resource service provider. For example, a service 406 so implemented may be subject to queuing or other load balancing system for incoming and outgoing data and requests, and is configured to service requests (such as read and write requests thereto) within a specified time, such as a time specified in a service-level agreement between the customer and the computing resource service provider. The service 406 may be similar to the services described above in connection with FIGS. 2 and 3, and may be provided by a computing resource service provider similar to that described above in connection with FIGS. 1-3.

In some embodiments, a service 406 may return outdated or "stale" data in response to some requests, such as reads, if pending writes for the data being read had not yet been committed at the time the service provides the data in response to a read request. In some embodiments, the staleness of data provided in response to read requests may vary based on a number of factors, such as load, geographic location of the hardware upon which it depends, changes in the level or amount of resources implementing the service, and the like. As a result, in some embodiments, the lag between write and read may differ considerably between reads. As previously discussed, lag may be defined by the delay between a time associated with the potential value returned, such as in response to a read request for a given application data element, and a time associated with the actual value returned. For example, the application 404 may write values A, B, and C to service 406 at relative times 0, 25, and 50, respectively, for a given application data element. If at relative time 75, the application 404 reads the application data element and the service 406 provides the value C, there is no lag, as the service 406 returned the most up-to-date value. However, if the service 406 returns B at relative time 75, the calculated lag would be 50. Similarly, if the service 406 returns A at relative time 75, the calculated lag would be 75. It is contemplated that a service 406 may have several application data elements that may change over time, and thus, the overall "picture" of read response and lag behavior may differ between them.

In some embodiments, a monitor 408 is implemented to observe some or all of the interactions between the application 404 and the service 406. The monitor 408 may be similar to the monitor 108 described above in connection with FIG. 1, and may include entity capable of monitoring data and interactions between the application 404 and the service 406. As previously discussed, the monitor may include a standalone computing entity, a virtual computing system (such as one provided by a computing resource service provider), a network processor or other network device, a software application running on a computing entity as described above, a service, and the like. The monitor 408 may be intrusive, i.e., intercept writes and reads to and from the service 406 and rebroadcast them to their intended target, or may pass through such read and write operations and observe them transparently, so as to kick off parallel computation (e.g., of sequence data and lag data) in response.

The monitor 408 may, in some embodiments, process and generate various types of data in response to its detection of writes to and reads from the service. For example, writes from the application 404 to the service 406 may trigger monitor 408 to generate sequence data associated with the write, and store such sequence data on sequence data store 410. Sequence data store 410 may be similar to the sequence data store 110 described above in connection with FIG. 1. The sequence data may be stored in, for example, a sequence database table 412 that includes a sequence number (e.g., an index), the data value associated with each write, and a timestamp associated with each write (e.g., a value representing the time at which the monitor detected that the application 404 was writing the data to the service 406). The timestamp may be represented in any appropriate unit, such as the time in minutes, seconds, milliseconds, microseconds, nanoseconds, picoseconds, timer ticks, and the like, and may be stored relative to any appropriate reference, such as a system clock, an atomic clock, the time relative to the application, the time relative to the service, the monitor's own clock, and the like. In embodiments where multiple application data elements are being tracked by the monitor 408, multiple sets of sequence data may be generated and stored on sequence data store 410. In some of such embodiments, multiple sequence database tables 412 are generated.

In some embodiments, read requests from the application 404 to the service 406 may trigger monitor 408 to generate lag data 416 associated with the read, and store such lag data 416 on lag data store 414. The lag data store 414 may be similar to lag data store 112 described above in connection with FIG. 1. The lag data 416 may be stored in, for example, a lag database table, and may be stored in sequential fashion (e.g., as a string of lag values), or in connection with metadata associated with the operation for which the particular lag value was observed (metadata including, e.g., an index, timestamps, operation-related information such as operation names, information related to the potential and observed value and/or sequence index, and the like), similarly to the sequence database table 412. For example, the lag data may include the lag value associated with each read for a given application data element, such as described above. The lag values may be represented in any appropriate unit, such as a difference in seconds, milliseconds, microseconds, nanoseconds, picoseconds, timer ticks, and the like. As previously discussed, in embodiments where the service multiple application data elements are being tracked by the monitor 408, multiple sets of lag data may be generated and stored on lag data store 412.

The sequence data store 410 and the lag data stores 414 may be any data stores capable of receiving data from the monitor 408 and persisting sequence data and lag data, respectively, as described above. For example, the sequence data store 401, the lag data store 414, or both, may be a database or other data storage entity. The sequence data store 401, the lag data store 414, or both, may be provided by the same or a different entity providing the monitor 408. For example, the sequence data store 401 and/or the lag data store 414 may be provided by a service of a computing resource service provider. In order to efficiently handle large quantities of data, one or both of the sequence data store 410 and/or the lag data store 414 may implement methods to periodically remove data stored thereon, such as by removing old entries beyond a predetermined quantity or prior to a predetermined time (e.g., "rolling over").

The monitor 408 may observe the interaction between the application 404 and the service 406 for a predetermined length of time, so as to record sufficient sequence data and lag data as to provide an accurate representation of the service's 406 consistency. In some embodiments, the monitor may run continuously and/or permanently. In some embodiments, the monitor 408, and in some of such embodiments, the sequence data store 410 and the lag data store 414, may be instantiated only when needed, and discarded and/or deactivated when operations relying on such entities are discontinued.

Figure 5:
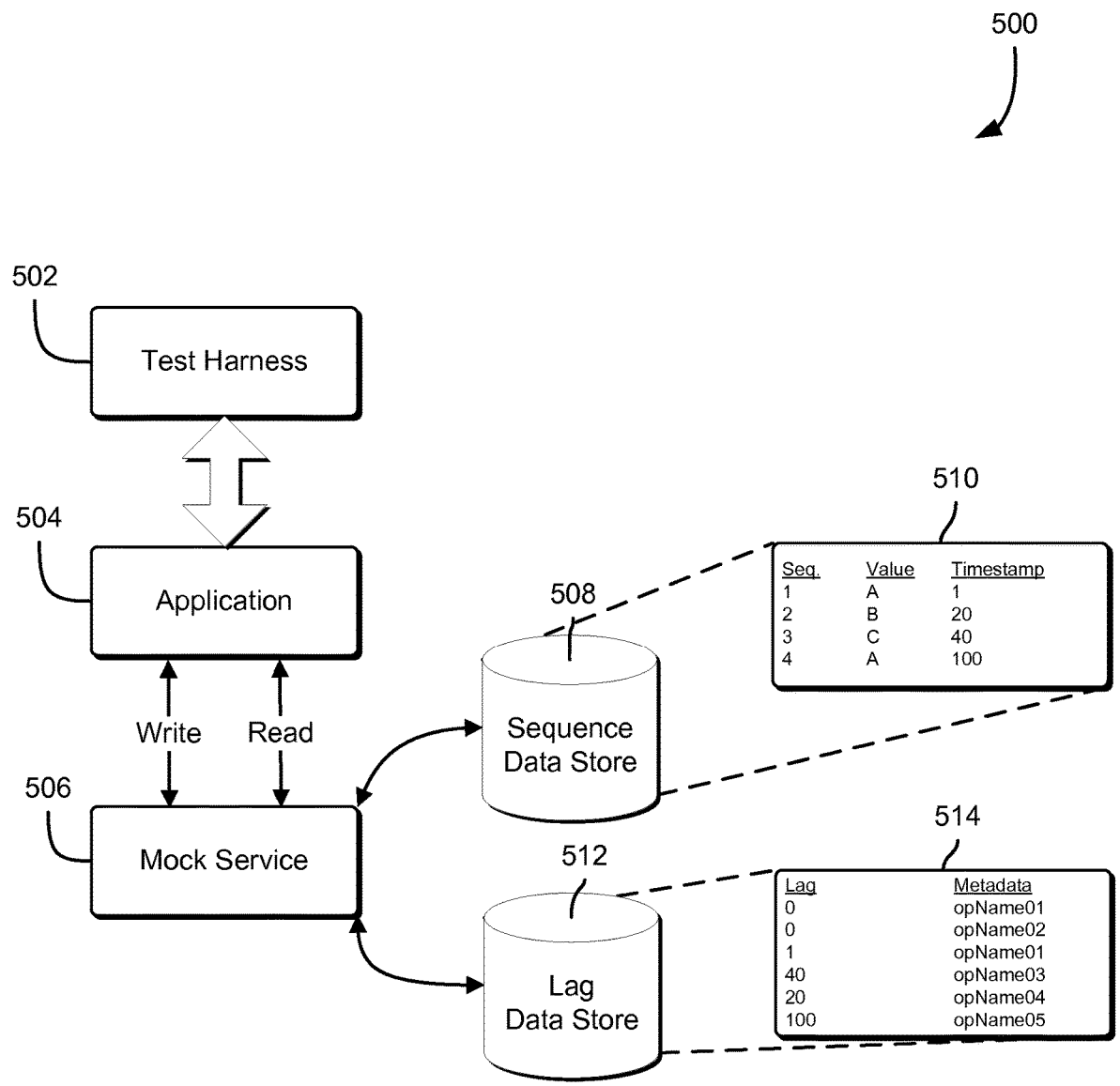
FIG. 5 schematically illustrates workflows for configuring a service using sequence data and lag data, in accordance with some embodiments.

FIG. 5 schematically illustrates workflows for configuring a service using sequence data and lag data, in accordance with some embodiments. At a time after sequence data and lag data have been recorded, such sequence data and/or lag data are used, such as by a test harness 502, to configure a mock service 506 for interaction with an application 504. The mock service 506 may be substantially similar in functionality to the service 106, 406, described above in connection with FIGS. 1 and 4, and may or may not be provided by the same entity as the service 106, 406. In some embodiments, the mock service 506 is a test service that is not accessible to the public and may not contain "live" data. In some embodiments, the test harness 502, the application 504, and the mock service 506, are also similar in functionality to the test harness 116, the application 118, and the mock service 114, described above in connection with at least FIG. 1. In some embodiments, the mock service may simply be the service 106, 406, and in other embodiments, the mock service may be a test version of the service 106, 406, or an interceptor entity that modifies requests for the first service.

In some embodiments, the sequence data store 508 is connected, directly or indirectly (such as by way of an entity such as the monitor 408), with the mock service 506 so as to populate mock service 506 with some or all of the historical data values associated with one or more application data elements of a service previously monitored and stored in sequence data table 510. The previously monitored service may be a service such as the service 106, 406 described above in connection with FIGS. 1 and 4. In such embodiments, the mock service 506 may read the sequence data directly from the sequence data store 508, or may use the sequence data stored thereon to derive the values to be stored separately by a separate data store accessible to the mock service 506.

In some embodiments, the lag data store 512 is connected, directly or indirectly (such as by way of an entity such as the monitor 108, 408), with the mock service 506 so as to configure the mock service 506 with the values of the lag data table 514, or a derivation thereof. For example, the mock service 506 may respond to read requests for the associated application data element with varying amounts of lag as dictated by the test harness 502. One or more of the lag values may be used to calculate one or more simulated lag values with which to configure the mock service 506. The calculation of the simulated lag value(s), as well as the configuration of the mock service 506, may be performed by any appropriate entity capable thereof, such as the application 504, the test harness 502, a monitoring entity such as monitor 108, 408, and so on. In some embodiments, the simulated lag value(s) may be manually calculated, such as by a human, and the mock service 506 may similarly be manually configured. In embodiments where multiple application data elements are being tracked, some of such embodiments may have differing lag values calculated for some or all of the application data elements.

In some embodiments, the simulated lag value may be calculated such that the mock service 506 is configured with a worst-case lag value among the lag data stored on the lag data store 512. For example, one or more of the highest lag values among the stored lag data may be determined to be a worst-case lag for the service (such as service 106, 406), and the mock service 506 may be thereby configured, such as by a test harness 502, to respond to read requests with the worst-case lag. In some embodiments, a mean, median, or other mathematical computation related to the lag values stored on the lag data store 512 may be used to configure the mock service 506. In some embodiments, lag values within a bound of the lag values stored in lag data table 514 on lag data store 512 may be selected randomly, or pseudo-randomly, such as by test harness 502, for configuration of mock service 506. For example, the mock service 506 may be configured to respond with a lag corresponding to a percentile or percentile range of the lag values in lag data table 514. As another example, so as to simulate maximum unpredictability, the mock service 506 may be configured to randomly select a lag value from the lag data table 514. In some embodiments, lag values may be selected from the lag data table 514 based in part on some or all of the metadata contained within.

In some embodiments, a sequence or other information in the lag values in lag table 514 may be used to configure the mock service 506 in a similar sequence, such as to "play back" various lag responses in a similar (or the same) order as previously observed (such as by monitor 108, 408) from the interactions between the originally observed application and service. In embodiments where multiple application data elements were tracked, it is contemplated that in some of such embodiments, a mock service 506 may be configured to play back associated lag sequences for some or all of the simulated application data elements of the mock service 506.

In some embodiments, the test harness 502 induces application 504 to interact with the configured mock service 506 in a similar fashion as with a previously monitored service, such as service 106, 406. In some embodiments, the test harness 502 is the same or substantially similar to the test harness used during the monitoring process. In some embodiments, the application 504 is the same or substantially similar to the previously monitored application. In alternate embodiments, the application 504 may be a test version, such as a newer or pre-release version. The mock service 506 may, in some embodiments, be the same or substantially similar in functionality to the previously monitored service. In certain embodiments, the mock service 506 may be provided by, for example, a computing resource service provider, such as a computing resource service provider providing the previously monitored service. In other embodiments, the mock service 506 may be provided by a different entity, such as a customer of the computing resource service provider, so as to simulate some or all of the functionality of the previously monitored service without connecting to the computing resource service provider.

Figure 6:
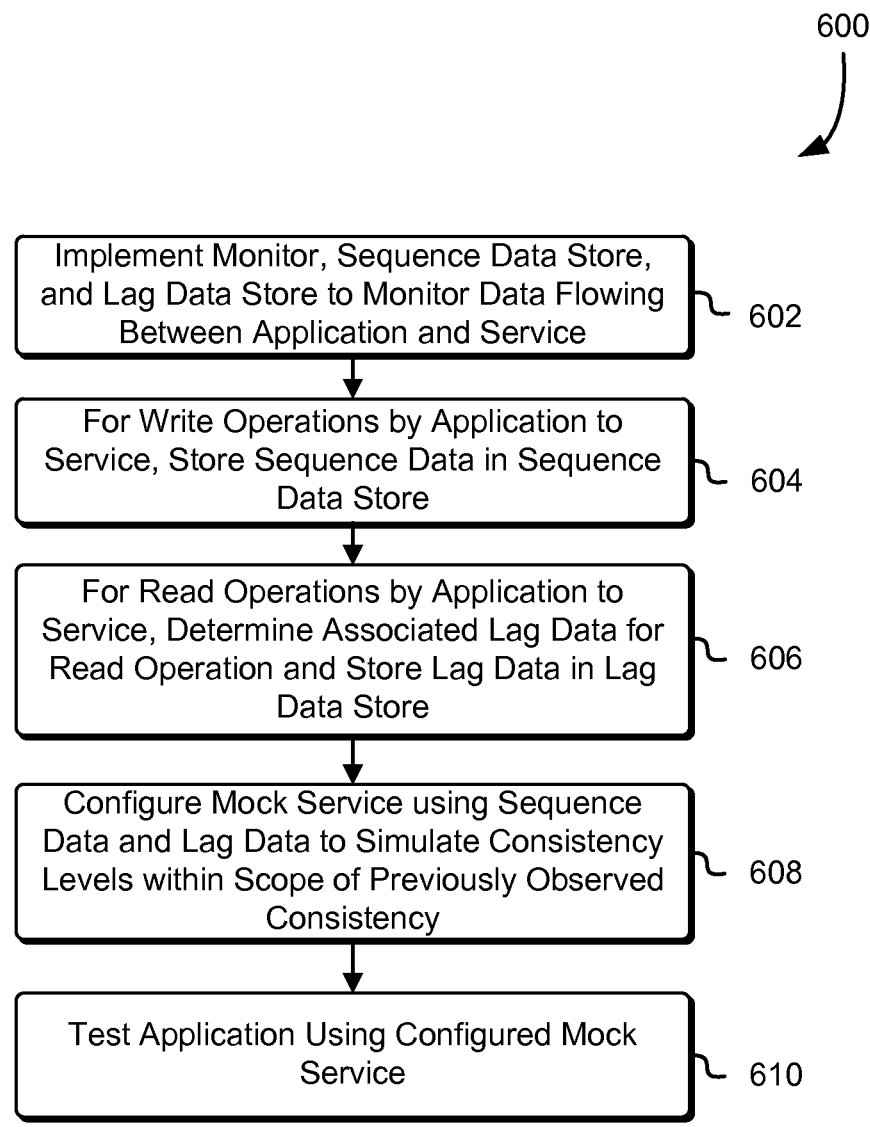
FIG. 6 schematically illustrates an example process for implementing an entity for monitoring write and read operations to a service, in accordance with some embodiments.

FIG. 6 schematically illustrates an example process 600 for implementing an entity for monitoring write and read operations to a service, in accordance with some embodiments. At step 602, an entity, such as a computing resource service provider, or a customer thereof, implements a monitor, a sequence data store, and a lag data store so as to monitor transactions between an application and a service. The computing resource service provider may be similar to that previously described, such as in FIG. 2. The monitor, sequence data store, and lag data store may be similar to any of the iterations thereof described above in connections with FIGS. 1 through 5.

At step 604, when an entity, such as the aforementioned monitor, detects a write operation by the application to the service, the entity generates and stores sequence data, such as data values, indexes, and timestamps associated with the write operation, on the sequence data store implemented in step 602. At step 606, when an entity, such as the monitor, detects a read operation by the application to the service, the entity determines the amount of lag between the potential value returned and the actual value returned, and stores that lag data on the lag data store implemented in step 602. The entity may use the sequence data stored in step 604 to determine the lag, and may query the sequence data store for information relevant to the calculation.

At step 608, an entity, such as a monitor, or, in some embodiments, a test harness associated with the application, configures a mock service using the sequence data and the lag data so as to simulate consistency levels within the scope of the consistency previously observed (such as by the monitor) for the service. As previously described, the mock service may be a separately implemented service from the monitored service. The test harness may be similar in functionality to that described above in connection with at least FIGS. 1 and 4-5. Consistency levels may be derived according to techniques described in further detail above, such as by determining worst-case lag values, replay sequences for lag values, and the like.

At step 610, the mock service configured in step 608 is connected with the application, such as by the test harness, and testing begins. It is contemplated that in certain embodiments, the interactions between the application and the configured mock service may be monitored in a fashion similar to that of the previously monitored service. For example, if the applications differ between the originally monitored application/service and the application under test, the lag results between the two may be compared so as to pinpoint specific behaviors.

Figure 7:
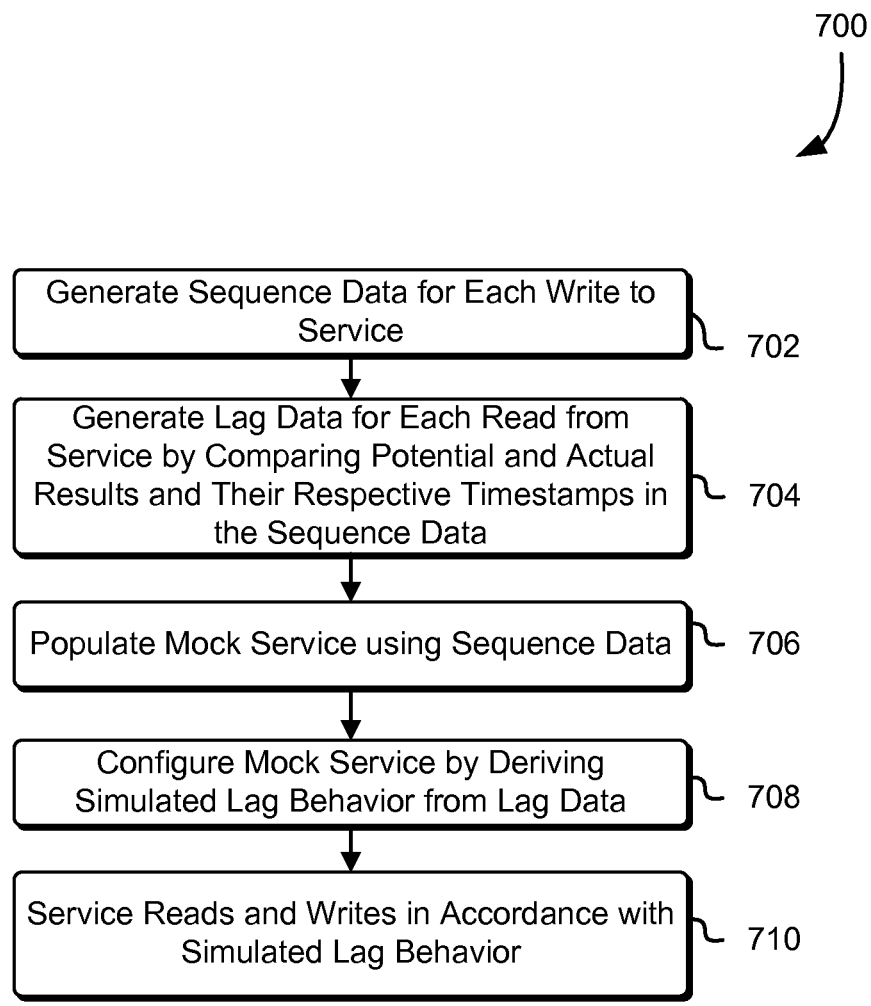
FIG. 7 schematically illustrates an example process for configuring a service to mimic one or more behaviors of another service, in accordance with some embodiments.

FIG. 7 schematically illustrates an example process 700 for configuring a service to simulate behavior of another service, in accordance with some embodiments. At step 702, sequence data is generated, such as by a monitor as previously described, for each write to a service for a given application data element, such as a service of a computing resource service provider. As previously discussed, sequence data may be gathered and generated continuously, or for a predetermined length of time (such as during specific testing phases for the application and/or service). At step 704, lag data is generated, such as by the monitor, for subsequent reads requesting the application data element. As previously discussed, the lag data may be generated by calculating lag based on the sequence data generated in step 702.

At step 706, the gathered sequence data is used to populate a mock service. As previously discussed, the gathered sequence data may be provided by an entity, such as the monitor, to the mock service, or in some embodiments, the mock service and the entity storing the gathered sequence data (such as a sequence data store as previously described) are directly associated. Also as previously discussed, some or all of the gathered sequence data may be used to populate the mock service. At step 708, the mock service is configured, such as by a test harness or the monitor, to behave with specific lag characteristics derived from the lag data generated in step 704. For example, the mock service may be configured to respond in a worst-case manner so as to test the ability of an application thereto to handle maximally stale responses from the service. As another example, the mock service may be configured to respond with a random lag value selected from the lag data gathered and generated in step 704. As yet another example, the mock service may be configured to replay lag behaviors previously observed of the actual service. At step 710, the test harness causes the application to interact with the mock service, which in turn services reads and writes emanating from the application in accordance with the simulated lag behavior configured in step 708.

Figure 8:
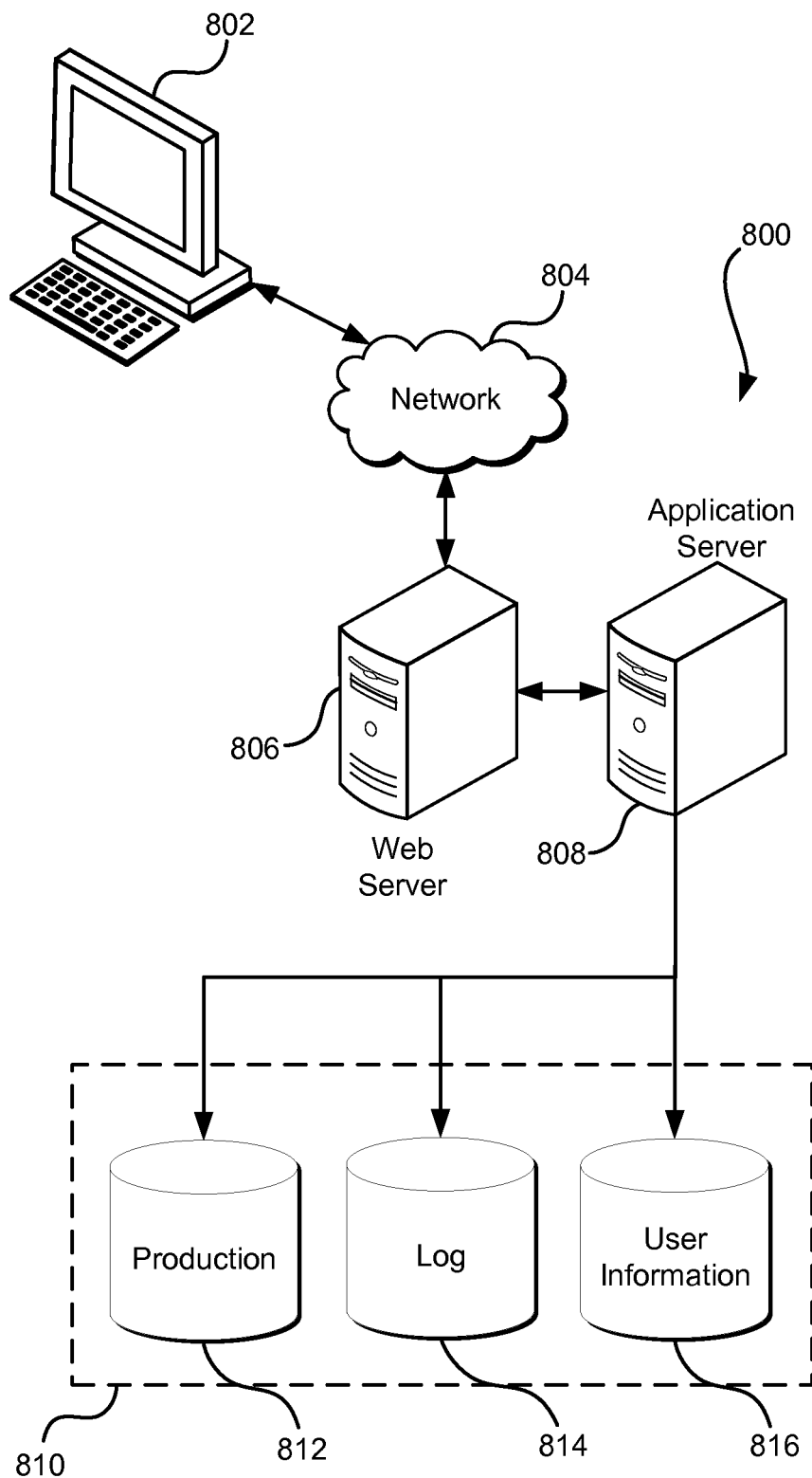
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    submitting a first write command to a first service to write first data;
    submitting, after the first write command, a write timestamp and a second write command to the first service to write second data different from the first data, the write timestamp corresponding to the second write command;
    submitting, after the second write command, a read command to the first service, the read command providing a result indicating the first data written by the first write command;
    determining, based at least in part on the result of the read command indicating the first data, a value based at least in part on a difference between the write timestamp that corresponds to the second write command and a read timestamp that corresponds to the read command;
    storing the value in a lag data store;
    determining, by a second service, simulated lag values from the value stored in the lag data store;
    causing the second service to delay results of write commands to be available via read commands according to a simulated lag value of the simulated lag values; and
    performing a test of an application that comprises transmission of a read command to the second service.

2. The computer-implemented method of claim 1, wherein the value reflects a worst case lag value for a data element written by the first write command.

3. The computer-implemented method of claim 1, wherein the second service is configured to replicate a behavior of the first service.

4. The computer-implemented method of claim 1, wherein the first service is a service provided by a computing resource service provider, and wherein the second service is a service provided by a customer of the computing resource service provider.

5. A system, comprising:
    one or more processors; and
    memory including instructions that, as a result of being executed by the one or more processors, cause the system to:
        submit, to a first service, a first write command to write first data;
        submit, to the first service, after the first write command, a second write command to write second data different from the first data;
        determine a time at which an effect of a read command, submitted after the second write command to the first service, indicates the first data written by the first write command;
        determine, based at least in part on an amount of time passed between submitting the second write command and the time, a value, the amount of time passed based on at least timestamp data corresponding to the second write command;
        store the value in a lag data store operably connected to the system;
        determine simulated lag values from the value stored in the lag data store;
        cause a second service to delay effects of write commands in accordance with a simulated lag value of the simulated lag values; and
        perform a test of an application that comprises transmission of a read command to the second service.

6. The system of claim 5, wherein the instructions, as a result of being executed by the one or more processors, further cause the system to configure the second service by providing the value that indicates lag to the second service.

7. The system of claim 5, wherein the instructions, as a result of being executed by the one or more processors, further cause the system to configure the second service by providing, to the second service, a summary of lag values for a set of application data elements.

8. The system of claim 5, wherein the second service is selected from the group consisting of: a test version of the first service, the first service, and an interceptor that modifies requests for the first service.

9. The system of claim 5, wherein the instructions, as a result of being executed by the one or more processors, further cause the system to determine simulated lag values from a plurality of generated lag values.

10. The system of claim 5, wherein the instructions further cause the system to determine the simulated lag values by generating one or more statistics related to the value.

11. The system of claim 10, wherein the statistics are selected from the group consisting of mean, median, maximum, and percentile.

12. The system of claim 5, wherein the first service is a service of a computing resource service provider that is physically separate from the system.

13. The system of claim 12, wherein the second service is under control of a customer of the computing resource service provider.

14. A non-transitory computer-readable storage medium storing executable instructions that, as a result of being executed by one or more processors of a computer system, cause the computer system to at least:
submit, to a first service, a first write command to write first data to a first data store;
submit, to the first service, after the first write command, a second write command to write a write timestamp and second data, different from the first data, to the first data store, the write timestamp corresponding to the second write command;
determine a lag value based at least in part on a time difference between the write timestamp and submission of a read command, after submission of the second write command, that returns the first data written by the first write command;
store the lag value in a lag data store;
determine at least one simulated lag value from the lag value stored in the lag data store;
cause a second service to delay results of write commands to be available via read commands according to the simulated lag value, the second service performing the write commands to a second data store different from the first data store; and
perform a test of an application that comprises transmission of a read command to the second service.

15. The non-transitory computer-readable storage medium of claim 14, wherein the instructions further cause the computer system to determine the lag value by at least subtracting a first time value associated with a write operation of an application data element from a second time value associated with a read operation of the application data element, the read operation reflecting commitment of the write operation.

16. The non-transitory computer-readable storage medium of claim 14, wherein the instructions further cause the computer system to calculate the lag value by at least:
performing a plurality of read operations of a data element; and
determining the lag value based at least in part on a difference between a first subset of timestamps that correspond to reading a first data value, and a second set of timestamps that correspond to reading a second data value.

17. The non-transitory computer-readable storage medium of claim 14, wherein the instructions further cause the computer system to derive the lag value by generating statistics related to a set of read and write operations.

18. The non-transitory computer-readable storage medium of claim 17, wherein the statistics are selected from a group consisting of mean, median, maximum, and percentile.

19. The non-transitory computer-readable storage medium of claim 14, wherein the instructions further cause the computer system to configure the second service by providing, to the second service, a summary derived from sequence data calculated from write operations to an application data element.

* * * * *